(12) United States Patent
Jiang et al.

(10) Patent No.: US 11,184,193 B2
(45) Date of Patent: *Nov. 23, 2021

(54) METHOD, APPARATUS, AND SYSTEM FOR SELECTING NETWORK DEVICE

(71) Applicant: Huawei Technologies Co., Ltd., Shenzhen (CN)

(72) Inventors: Yuanlong Jiang, Dongguan (CN); Liangyuan Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,585

(22) Filed: Mar. 17, 2020

(65) Prior Publication Data
US 2020/0267021 A1    Aug. 20, 2020

Related U.S. Application Data

(63) Continuation of application No. 15/153,532, filed on May 12, 2016, now Pat. No. 10,616,002, which is a (Continued)

(30) Foreign Application Priority Data

Jan. 11, 2011    (CN) .......................... 201110004507.0

(51) Int. Cl.
*H04L 12/46*    (2006.01)
*H04L 12/721*    (2013.01)

(52) U.S. Cl.
CPC .......... *H04L 12/4675* (2013.01); *H04L 45/68* (2013.01)

(58) Field of Classification Search
None
See application file for complete search history.

(56) References Cited

U.S. PATENT DOCUMENTS

2004/0081180 A1* 4/2004 De Silva ............... H04L 49/354
370/402
2006/0245436 A1    11/2006 Sajassi
(Continued)

FOREIGN PATENT DOCUMENTS

CN    101552711 A    10/2009
CN    101719857 A    6/2010

OTHER PUBLICATIONS

Andersson et al., "LDP Specification," Network Working Group, Request for Comments: 5036, Obsoletes: 3036, Category: Standards Track, pp. 1-135, The IETF Trust, Reston, Virginia, (Oct. 2007).

(Continued)

*Primary Examiner* — Gregory B Sefcheck
*Assistant Examiner* — Amarnauth G Persaud
(74) *Attorney, Agent, or Firm* — Leydig, Voit & Mayer, Ltd.

(57) ABSTRACT

An apparatus includes a program instructing hardware and a computer readable storage medium coupled to the hardware and storing programming instructions for execution by the hardware. The programming instructions instruct the hardware to: receive a network device selection message sent by a first network device, where the network device selection message contains a virtual local area network (VLAN) mapping capability identifier of the first network device and a device identifier of the first network device; when determining that both the apparatus and the first network device have VLAN mapping capability according to local VLAN mapping capability and the VLAN mapping capability identifier of the first network device, select a network device for executing VLAN mapping according to sizes or a sequence of a local device identifier and the device identifier of the first network device.

18 Claims, 2 Drawing Sheets

Related U.S. Application Data continuation of application No. 13/937,938, filed on Jul. 9, 2013, now Pat. No. 9,356,802, which is a continuation of application No. PCT/CN2011/080809, filed on Oct. 14, 2011.

(56) References Cited

U.S. PATENT DOCUMENTS

| | | | |
|---|---|---|---|
| 2007/0115913 A1* | 5/2007 | Li | H04L 12/465 370/349 |
| 2010/0208615 A1 | 8/2010 | Soon et al. | |
| 2011/0026439 A1 | 2/2011 | Rollins | |
| 2011/0299539 A1* | 12/2011 | Rajagopal | H04L 49/351 370/395.53 |
| 2012/0120957 A1* | 5/2012 | Ould-Brahim | H04L 12/4641 370/392 |
| 2012/0147893 A1 | 6/2012 | Shabtay et al. | |
| 2012/0275347 A1* | 11/2012 | Banerjee | H04L 45/00 370/256 |
| 2012/0300784 A1 | 11/2012 | Jiang | |
| 2013/0028176 A1* | 1/2013 | Le Sage | H04W 12/06 370/328 |
| 2014/0204942 A1 | 7/2014 | Kermarec et al. | |
| 2014/0204951 A1 | 7/2014 | Kermarec et al. | |
| 2014/0226670 A1* | 8/2014 | Yong | H04L 45/50 370/392 |

OTHER PUBLICATIONS

Martini et al., "Pseudowire Setup and Maintenance Using the Label Distribution Protocol (LDP)," Network Working Group, Request for Comments: 4447, Category: Standards Track, pp. 1-33, The Internet Society, Reston, Virginia, (Apr. 2006).
Kompella et al., "Virtual Private LAN Service (VPLS) Using BGP for Auto-Discovery and Signaling," Network Working Group, Request for Comments: 4761, Category: Standards Track, pp. 1-28, The IETF Trust, Reston, Virginia (Jan. 2007).
Jiang, "VPLS PE Model for E-Tree Support," Internet Working Group, Internet Draft, Standards Track, pp. 1-14, Internet Society, Reston, Virginia (Jul. 12, 2010).
Jiang, "VPLS PE Model for E-Tree Support," draft-jiang-l2-vpn-pvls-pe-etree-01.bct [online] <http://tools.ietf.org/html/draft-jiang-l2vpn-vpls-pe-etree-01 > (Jul. 12, 2010).
Jiang et al., "VPLS PE Model for E-Tree Support," Internet Draft, Internet Working Group, draft-jiang-12vpn-vpls-pe-etree-02.txt, Internet Engineering Task Force (IETF) Trust (Oct. 2010).
Key et al., "Extension to VPLS for E-Tree," Internet Draft, Network Working Group, draft-key-l2vpn-pvls-etree-02.txt, Internet Engineering Task Force (IETF) Trust, Reston,Virginia (Jan. 2010).
"Ethernet Services Definitions—Phase 2," MEF Technical Specification, MEF 6.1, Metro Ethernet Forum (MEF) (Apr. 2008).
Andersson et al., "Framework for Layer 2 Virtual Private Networks (L2VPNs)," Memo, Network Working Group, http://ietf.org/rfc/rfc4664.txt. The Internet Society (Sep. 2006).
Extended European Search Report in corresponding European Patent Application No. 11855324.7 (dated Oct. 7, 2013).
International Search Report in corresponding PCT Patent Application No. PCT/CN2011/080809 (dated Jan. 19, 2012).
Written Opinion in corresponding PCT Patent Application No. PCT/CN2011/080809 (dated Jan. 19, 2012).

* cited by examiner

METHOD, APPARATUS, AND SYSTEM FOR SELECTING NETWORK DEVICE

CROSS-REFERENCE TO RELATED APPLICATIONS

This application is a continuation of U.S. patent application Ser. No. 15/153,532, filed on May 12, 2016, which is a continuation of U.S. patent application Ser. No. 13/937,938, filed on Jul. 9, 2013, now U.S. Pat. No. 9,356,802, which is a continuation of International Patent Application No. PCT/CN2011/080809, filed on Oct. 14, 2011, which claims priority to Chinese Patent Application No. 201110004507.0, filed on Jan. 11, 2011. All of the aforementioned applications are hereby incorporated by reference in their entireties.

TECHNICAL FIELD

The present invention relates to the field of network communications, and in particular to a method, an apparatus, and a system for selecting a network device.

BACKGROUND

An Ethernet tree (E-Tree) is an Ethernet virtual circuit (EVC) service defined by the metro Ethernet forum (MEF). The E-Tree has the following features:

A root node and a leaf node are in a one-to-multiple relationship, and multiple root nodes may exist;

a root node may send an Ethernet frame to any other root node and any leaf node, and a leaf node may send an Ethernet frame to any root node; and a leaf node cannot directly connect to and must be isolated from another leaf node.

A virtual private local area network service (VPLS) is a technology which uses wide area network (WAN) architecture to virtualize an Ethernet local area network. The VPLS is capable of providing a multipoint-to-multipoint connection, similar to that of a local area network (LAN), on a multi-protocol label switching (MPLS) network, which makes it convenient for users to simultaneously access the MPLS network from multiple geographically scattered points and access each other, as if these points were directly connected to a LAN. Because currently core networks mainly use an Internet Protocol (IP)/MPLS technology, requirements of providing a virtual Ethernet service through the VPLS is increasing and it has already been widely deployed.

An existing technology for providing the E-Tree by using the VPLS is to use different virtual local area networks (VLAN) to identify whether Ethernet frames come from a root node or a leaf node: On a provider edge (PE) device, a corresponding root VLAN identifier or leaf VLAN identifier is added according to whether an E-Tree access port is a root or leaf, and then a packet marked with the root VLAN identifier or leaf VLAN identifier is transferred through a pseudo wire (PW) to a peer PE; and on the peer PE, the VLAN identifier carried in the packet is converted into a local VLAN identifier, and then corresponding forwarding or filtering is performed; for example, a frame from a root VLAN is forwarded on a leaf port, a frame from a leaf VLAN is filtered on the leaf port, and the like.

For higher network scalability, each PE may generally use an independent VLAN space of its own, and a PE with a unidirectional PW egress performs appropriate VLAN translation. For example, there is a bidirectional PW between a PE 1 and a PE 2, that is, a PW 1 in a forward direction and a PW 2 in a reverse direction are connected; E-Tree service types on the PE 1 are identified as Root1 VLAN and Leaf1 VLAN; and E-Tree service types on the PE 2 are identified as Root2 VLAN and Leaf2 VLAN. The value of the Root1 VLAN may be different from the value of the Root2 VLAN, and the value of the Leaf1 VLAN may be different from the value of the Leaf2 VLAN. Therefore, an E-Tree service packet borne on the PW 1 in the forward direction from the PE 1 to the PE 2 carries Root1 VLAN or Leaf1 VLAN, which is converted on the egress PE 2 into Root2 VLAN or Leaf2 VLAN, respectively; and an E-Tree service packet borne on the PW 2 in the reverse direction from the PE 2 to the PE 1 carries Root2 VLAN or Leaf2 VLAN, which is converted on the egress PE 1 into Root1 VLAN or Leaf1 VLAN, respectively. In this way, four different VLAN identifiers appear on the bidirectional PW, bringing difficulties in E-Tree service maintenance and detection.

SUMMARY

Embodiments of the present invention provide a method, an apparatus, and a system for selecting a network device so as to solve the following problem during E-Tree service providing in the prior art: When a PE uses an independent VLAN space, four different VLAN identifiers exist on a bidirectional PW, bringing difficulties in E-Tree service maintenance and detection.

To solve the foregoing technical problem, an embodiment of the present invention provides a method for selecting a network device, including:

receiving, by a second network device, a network device selection message sent by a first network device, where the network device selection message contains a VLAN mapping capability identifier of the first network device; and selecting, by the second network device, according to the VLAN mapping capability identifier and local VLAN mapping capability, a network device for executing VLAN mapping.

An embodiment of the present invention provides an apparatus for selecting a network device, including:

a receiving module, configured to receive a network device selection message sent by a first network device, where the network device selection message contains a VLAN mapping capability identifier of the first network device; and a selecting module, configured to select, according to the VLAN mapping capability identifier and local VLAN mapping capability, a network device for executing VLAN mapping.

An embodiment of the present invention provides a system for selecting a network device, including:

a first network device, configured to send a network device selection message to a second network device, where the network device selection message contains a VLAN mapping capability identifier; and a second network device, configured to receive the network device selection message, and select, according to the VLAN mapping capability identifier and local VLAN mapping capability, a network device for executing VLAN mapping.

By using the technical solutions provided in the embodiments of the present invention, it may be ensured that VLAN mapping is executed for a PW in a forward direction and a PW in a reverse direction on a same PE, and there are only two VLAN identifiers on a bidirectional PW, thereby ensuring consistency of VLANs in the bidirectional PW and making it simpler and easier to maintain and detect the PW.

BRIEF DESCRIPTION OF DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and a person having ordinary skill in the art may still derive other drawings from these accompanying drawings without creative efforts.

DESCRIPTION OF EMBODIMENTS

The following is an exemplary description of a specific implementation process of the present invention by using embodiments. Apparently, the embodiments described in the following are merely a part rather than all of the embodiments of the present invention. All other embodiments obtained by a person having ordinary skill in the art based on the embodiments of the present invention without creative efforts shall fall within the protection scope of the present invention.

An embodiment of the present invention provides a method for selecting a network device. The method includes: receiving, by a second network device, a network device selection message sent by a first network device, where the network device selection message contains a VLAN mapping capability identifier of the first network device; and selecting, by the second network device, according to the VLAN mapping capability identifier and local VLAN mapping capability, a network device for executing VLAN mapping. By using the technical solution provided in this embodiment of the present invention, it may be ensured that VLAN mapping is executed for a PW in a forward direction and a PW in a reverse direction on a same PE, and there are only two VLAN identifiers on a bidirectional PW, thereby ensuring consistency of VLANs in the bidirectional PW and making it simpler and easier to maintain and detect the PW.

To make the objectives, features, and advantages of the embodiment of the present invention more obvious and comprehensible, the following further describes this embodiment of the present invention in detail with reference to the accompanying drawings and specific embodiments.

Figure 1:
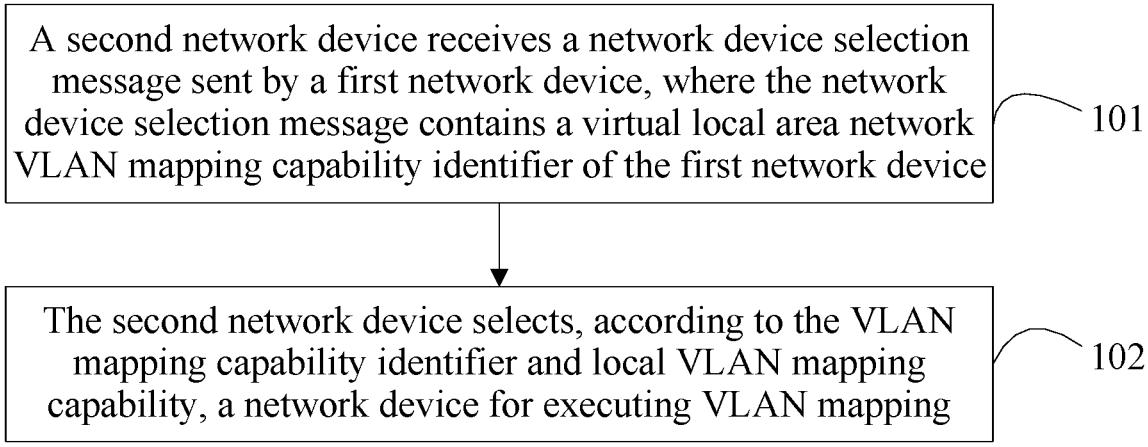
FIG. 1 is a flowchart of a method for selecting a network device according to a first embodiment of the present invention.

Refer to FIG. 1, which is a flowchart of a method for selecting a network device according to a first embodiment of the present invention. Specific steps are as follows:

Step 101: A second network device receives a network device selection message sent by a first network device, where the network device selection message contains a VLAN mapping capability identifier of the first network device.

The first network device and the second network device may be provider edge PE devices on a VPLS network. The first network device may carry the VLAN mapping capability identifier of the first network device by extending a label distribution protocol (LDP) message or a border gateway protocol (BGP) message.

Step 102: The second network device selects, according to the VLAN mapping capability identifier and local VLAN mapping capability, a network device for executing VLAN mapping.

Figure 2:
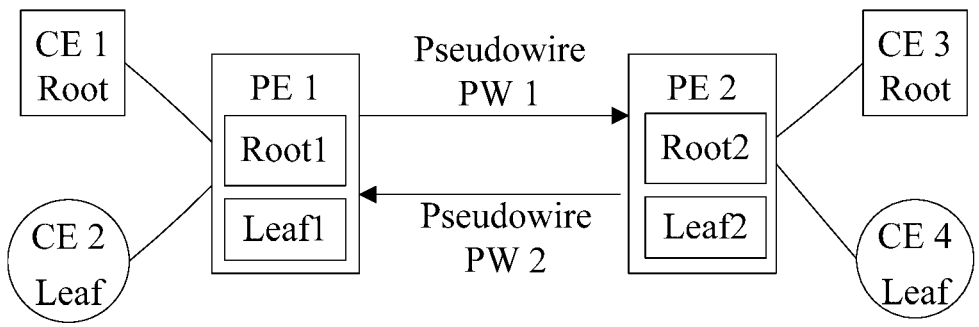
FIG. 2 is a schematic diagram of a network on which an E-Tree service is provided by using a VPLS technology.

The selecting a network device for executing VLAN mapping is completed through automatic negotiation according to the VLAN mapping capability identifier. For example, as shown in FIG. 2, a bidirectional PW needs to be established between a PE 1 and a PE 2 so as to provide an E-Tree service. The bidirectional PW is formed of a PW 1 in a forward direction and a PW 2 in a reverse direction. During establishment of the PW 1 in the forward direction, the PE 2 at an egress end sends an extended LDP message to the PE 1 at an ingress end, where an E-Tree-related sub-TLV (sub TLV) is added in a PW interface parameter TLV (Type-Length-Value) in the extended LDP message, to carry a VLAN mapping capability identifier V2 of the PE 2. After receiving the extended LDP message, the PE 1 establishes the PW 1 in the forward direction and selects, according to local VLAN mapping capability and the V2 carried in the extended LDP message, a network device for executing VLAN mapping. During establishment of the PW 2 in the reverse direction, the PE 1 at an egress end sends an extended LDP message that carries V1 to the PE 2 at an ingress end. After receiving the extended LDP message, the PE 2 establishes the PW 2 in the reverse direction and selects, according to local VLAN mapping capability and the V1 carried in the extended LDP message, a network device for executing VLAN mapping.

When it is determined according to the V1 and the V2 that only one PE out of the PE 1 and the PE 2 has VLAN mapping capability, the PE is selected as the network device for executing VLAN mapping.

Figure 3:
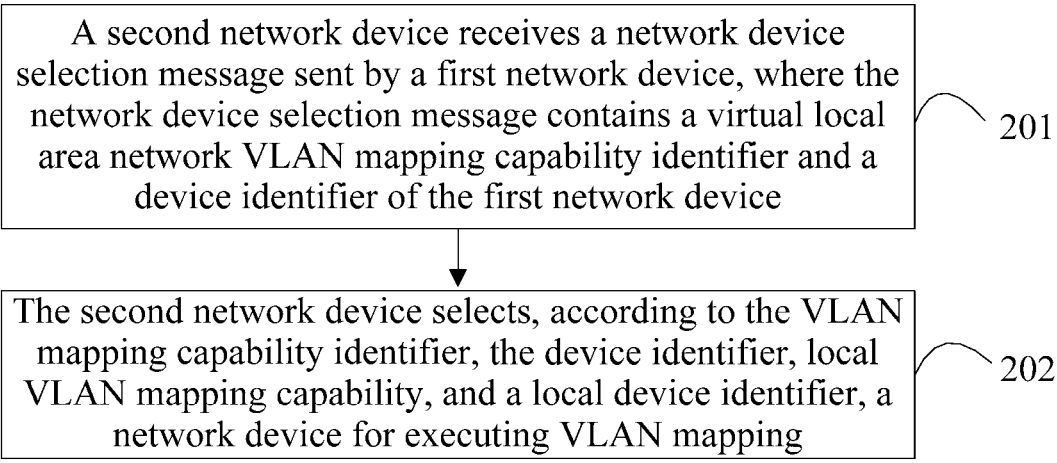
FIG. 3 is a flowchart of a method for selecting a network device according to a second embodiment of the present invention.

Refer to FIG. 3, which is a flowchart of a method for selecting a network device according to a second embodiment of the present invention. Specific steps are as follows:

Step 201: A second network device receives a network device selection message sent by a first network device, where the network device selection message contains a VLAN mapping capability identifier and a device identifier of the first network device.

The first network device and the second network device may be provider edge PE devices on a VPLS network; the first network device may carry the VLAN mapping capability identifier and the device identifier of the first network device by extending a LDP message or a BGP message; and when the device identifier of the first network device is an IP address, the device identifier may be obtained from an IP packet header of the network device selection message, and a specific field does not need to be extended in the network device selection message.

Step 202: The second network device selects, according to the VLAN mapping capability identifier, the device identifier, local VLAN mapping capability, and a local device identifier, a network device for executing VLAN mapping.

The selecting a network device for executing VLAN mapping is completed through automatic negotiation according to the VLAN mapping capability identifier and the device identifiers. For example, as shown in FIG. 2, a bidirectional PW needs to be established between a PE 1 and a PE 2 so as to provide an E-Tree service. The bidirectional PW is formed of a PW 1 in a forward direction and a PW 2 in a reverse direction. During establishment of the PW 1 in the forward direction, the PE 2 at an egress end sends an extended LDP message to the PE 1 at an ingress end, where an E-Tree-related sub-TLV (sub TLV) is added in a PW interface parameter TLV (Type-Length-Value) in the extended LDP message, to carry a VLAN mapping capability identifier V2 and a device identifier Node ID2 of the PE 2. After receiving the extended LDP message, the PE 1 establishes the PW 1 in the forward direction and selects, according to local VLAN mapping capability and a local device identifier Node ID1 as well as the V2 and Node ID2 carried in the extended LDP message, a network device for executing VLAN mapping. During establishment of the PW 2 in the reverse direction, the PE 1 at an egress end sends an extended LDP message that carries V1 and the Node ID1 to the PE 2 at an ingress end. After receiving the extended LDP message, the PE 2 establishes the PW 2 in the reverse direction and selects, according to local VLAN mapping capability and the Node ID2 as well as the V1 and Node ID1 carried in the extended LDP message, a network device for executing VLAN mapping.

When it is determined according to the V1 and the V2 that both the PE 1 and the PE 2 have VLAN mapping capability, one PE is selected, according to the device identifiers Node ID1 and Node ID2, as the network device for executing VLAN mapping. For example, a selection policy is to select a PE with a smallest device identifier as the network device for executing VLAN mapping; for example, if the NodeID1 is smaller than the NodeID2, the PE 1 is selected to execute VLAN mapping whereas the PE 2 disables a local VLAN mapping function. If Node IDs are not in a numerical form, the Node IDs may be sorted so that a network device, such as a network device corresponding to a front-most Node ID after the sorting, is selected according to a sequence of the device identifiers.

According to the technical solution provided in the embodiments of the present invention, the bidirectional PW executes VLAN mapping on the same PE device, for example, on the PE 1. When the PE 1 wants to send an Ethernet frame of the E-Tree service to the PE 2 through the PW 1, the PE 1 first executes VLAN mapping to map local VLAN identifiers Root1 and Leaf1 to VLAN identifiers Root2 and Leaf2 of the peer PE 2 respectively, and then sends a packet marked with a VLAN identifier Root2 or Leaf2 to the PE 2 through the PW 1. After receiving the packet, the PE 2 directly forwards the packet to a corresponding root or leaf port according to the VLAN identifier Root2 or Leaf2. On the contrary, when the PE 2 sends an Ethernet frame of the E-Tree service to the PE 1 through a PW 2, the PE 2 directly sends a packet marked with the VLAN identifier Root2 or Leaf2 to the PE 1 through the PW 2. After receiving the packet, the PE 1 first executes VLAN mapping to map the Root2 or Leaf2 to the local Root1 or Leaf1, and then forwards the packet to a corresponding root or leaf port. Therefore, packets borne on the PW 1 and the PW 2 all carry the Root2 or Leaf2, thereby solving the following problem in the prior art: When PEs separately perform VLAN mapping, four different VLAN identifiers exist on a bidirectional PW, bringing difficulties in service maintenance and detection.

Figure 4:
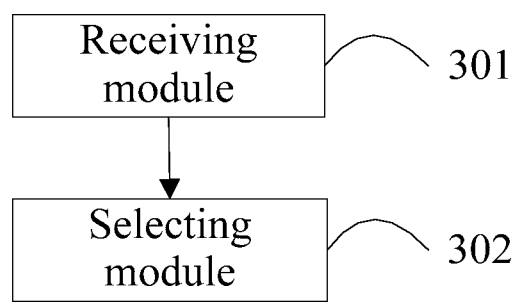
FIG. 4 is a block diagram of an apparatus for selecting a network device according to a third embodiment of the present invention.

Refer to FIG. 4, which is a block diagram of an apparatus for selecting a network device according to a third embodiment of the present invention. The apparatus specifically includes a receiving module 301 and a selecting module 302, where:

the receiving module 301 is configured to receive a network device selection message sent by a first network device, and the network device selection message contains a VLAN mapping capability identifier; and the selecting module 302 is configured to select, according to the VLAN mapping capability identifier and local VLAN mapping capability, a network device for executing VLAN mapping.

The network device selection message may further contain a device identifier of the first network device; and accordingly, the selecting module 302 is configured to select, according to the VLAN mapping capability identifier, the device identifier, the local VLAN mapping capability, and a local device identifier, the network device for executing VLAN mapping.

When it is determined, according to the VLAN mapping capability identifier and the local VLAN mapping capability, that both a local network device and the first network device have VLAN mapping capability, the selecting module is specifically configured to select, according to sizes or a sequence of the device identifier and the local device identifier, a network device for executing VLAN mapping.

Figure 5:
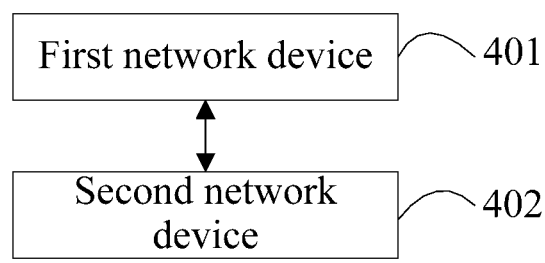
FIG. 5 is a schematic diagram of a system for selecting a network device according to a fourth embodiment of the present invention.

Refer to FIG. 5, which is a schematic diagram of a system for selecting a network device according to a fourth embodiment of the present invention. The system includes:

a first network device 401, configured to send a network device selection message to a second network device 402, where the network device selection message contains a VLAN mapping capability identifier of the first network device 401; and the second network device 402, configured to receive the network device selection message, and select, according to the VLAN mapping capability identifier and local VLAN mapping capability, a network device for executing VLAN mapping.

The network device selection message may further contain a device identifier of the first network device; and accordingly, the second network device 402 is configured to receive the network device selection message, and select, according to the VLAN mapping capability identifier, the device identifier, the local VLAN mapping capability, and a local device identifier, the network device for executing VLAN mapping.

The first network device and the second network device may be provider edge PE devices on a VPLS network. The first network device may use an extended LDP message or a BGP message to send the network device selection message to the second network device.

By using the technical solutions provided in the embodiments of the present invention, because a network device for executing VLAN mapping is selected by using a device selection message, it may be ensured that VLAN mapping is executed for a PW in a forward direction and a PW in a reverse direction on the same PE, thereby solving the following problem in the prior art: When PEs separately perform VLAN mapping, four different VLAN identifiers exist on a bidirectional PW, bringing difficulties in service maintenance and detection.

Although all the embodiments of the present invention describe negotiation between only two PEs for selecting a network device for executing VLAN mapping, for an E-Tree composed of more PEs, a process of negotiation and selection between any two PEs may still use the technical solutions provided in embodiments of the present invention.

It should be noted that the relational terms herein such as first and second are used only to differentiate an entity or operation from another entity or operation, and do not require or imply any actual relationship or sequence between these entities or operations. Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

A person having ordinary skill in the art should understand that all or a part of the steps in the method embodiments may be implemented by a program instructing relevant hardware. The program may be stored in a computer readable storage medium. When the program is run, the steps in the method embodiments are performed. The storage medium may be any medium capable of storing program codes, such as a read-only memory (ROM), a random access memory (RAM), a magnetic disk, or an optical disk.

The foregoing descriptions are merely specific exemplary embodiments of the present invention, but are not intended to limit the protection scope of the present invention. Any variation or replacement readily figured out by the skilled person within the technical scope disclosed in the present invention shall fall within the protection scope of the present invention. Therefore, the protection scope of the present invention shall be subject to the protection scope of the claims.

The invention claimed is:

1. An apparatus, comprising:
    a processor; and
    a non-transitory computer-readable medium having processor-executable instructions stored thereon, wherein the processor-executable instructions, when executed by the processor, facilitate the following being performed on the apparatus:
    obtaining a virtual local area network (VLAN) mapping capability identifier of a first network device from the first network device, wherein the VLAN mapping capability identifier of the first network device indicates whether the first network device has VLAN mapping capability;
    determining that the apparatus has VLAN mapping capability based on a local VLAN mapping capability of the apparatus and that the first network device does not have VLAN mapping capability based on the VLAN mapping capability identifier of the first network device; and
    in response to determining that the apparatus has VLAN mapping capability and that the first network device does not have VLAN mapping capability, determining that the apparatus is to execute VLAN mapping.

2. The apparatus according to claim 1, wherein obtaining the VLAN mapping capability identifier of the first network device from the first network device further comprises:
    receiving a message from the first network device, wherein the message comprises the VLAN mapping capability identifier of the first network device.

3. The apparatus according to claim 2, wherein the message is a label distribution protocol (LDP) message.

4. The apparatus according to claim 3, wherein the LDP message comprises a pseudo wire (PW) interface type-length-value (TLV) and the TLV comprises the VLAN mapping capability identifier of the first network device.

5. The apparatus according to claim 2, wherein the message is a border gateway protocol (BGP) message.

6. The apparatus according to claim 1, wherein the processor-executable instructions, when executed by the processor, further facilitate the following being performed on the apparatus:
    enabling a local VLAN mapping function of the apparatus.

7. A method, comprising:
    obtaining, by an apparatus, a virtual local area network (VLAN) mapping capability identifier of a first network device from the first network device, wherein the VLAN mapping capability identifier of the first network device indicates whether the first network device has VLAN mapping capability;
    determining, by the apparatus, that the apparatus has VLAN mapping capability based on a local VLAN mapping capability of the apparatus and that the first network device does not have VLAN mapping capability based on the VLAN mapping capability identifier of the first network device; and
    in response to determining that the apparatus has VLAN mapping capability and that the first network device does not have VLAN mapping capability, determining, by the apparatus, that the apparatus is to execute VLAN mapping.

8. The method according to claim 7, wherein obtaining the VLAN mapping capability identifier of the first network device from the first network device further comprises:
    receiving, by the apparatus, a message from the first network device, wherein the message comprises the VLAN mapping capability identifier of the first network device.

9. The method according to claim 8, wherein the message is a label distribution protocol (LDP) message.

10. The method according to claim 9, wherein the LDP message comprises a pseudo wire (PW) interface type-length-value (TLV) and the TLV comprises the VLAN mapping capability identifier of the first network device.

11. The method according to claim 8, wherein the message is a border gateway protocol (BGP) message.

12. The method according to claim 7, further comprising:
    enabling, by the apparatus, a local VLAN mapping function.

13. A non-transitory storage medium having executable instructions stored thereon for determining whether an apparatus is to execute virtual local area network (VLAN) mapping, wherein the executable instructions, when executed, facilitate:
    obtaining a VLAN mapping capability identifier of a first network device from the first network device, wherein the VLAN mapping capability identifier of the first network device indicates whether the first network device has VLAN mapping capability;
    determining that the apparatus has VLAN mapping capability based on a local VLAN mapping capability of the apparatus and that the first network device does not have VLAN mapping capability based on the VLAN mapping capability identifier of the first network device; and
    in response to determining that the apparatus has VLAN mapping capability and that the first network device does not have VLAN mapping capability, determining that the apparatus is to execute VLAN mapping.

14. The non-transitory storage medium according to claim 13, wherein obtaining the VLAN mapping capability identifier of the first network device from the first network device further comprises:

receiving a message from the first network device, wherein the message comprises the VLAN mapping capability identifier of the first network device.

15. The non-transitory storage medium according to claim 14, wherein the message is a label distribution protocol (LDP) message.

16. The non-transitory storage medium according to claim 15, wherein the LDP message comprises a pseudo wire (PW) interface type-length-value (TLV) and the TLV comprises the VLAN mapping capability identifier of the first network device.

17. The non-transitory storage medium according to claim 14, wherein the message is a border gateway protocol (BGP) message.

18. The non-transitory storage medium according to claim 13, wherein the executable instructions, when executed, further facilitate:

enabling a local VLAN mapping function of the apparatus.

\* \* \* \* \*